US008882985B2

United States Patent
Mok et al.

(10) Patent No.: US 8,882,985 B2
(45) Date of Patent: Nov. 11, 2014

(54) PERCHLORATE REMOVAL FROM CONCENTRATED SALT SOLUTIONS USING AMPHOTERIC ION-EXCHANGE RESINS

(75) Inventors: Felix M. F. Mok, Vancouver (CA); Ronald P. Van Heek, Vancouver (CA); Gilbert Thibault, Vancouver (CA); Thomas S. Drackett, Vancouver (CA)

(73) Assignee: Chemetics Inc., Vancouver, British Columbia (CA)

( * ) Notice: Subject to any disclaimer, the term of this patent is extended or adjusted under 35 U.S.C. 154(b) by 603 days.

(21) Appl. No.: 13/139,613

(22) PCT Filed: Dec. 17, 2008

(86) PCT No.: PCT/CA2008/002205
§ 371 (c)(1),
(2), (4) Date: Jul. 25, 2011

(87) PCT Pub. No.: WO2010/069031
PCT Pub. Date: Jun. 24, 2010

(65) Prior Publication Data
US 2012/0152759 A1    Jun. 21, 2012

(51) Int. Cl.
*C02F 1/42*         (2006.01)
*B01J 43/00*        (2006.01)
*C02F 101/12*       (2006.01)

(52) U.S. Cl.
CPC .............. *C02F 1/42* (2013.01); *C02F 2101/12* (2013.01); *B01J 43/00* (2013.01)
USPC ............ 205/536; 205/566; 210/672; 210/673

(58) Field of Classification Search
USPC ................... 205/536, 556, 742; 210/672, 673
See application file for complete search history.

(56) References Cited

U.S. PATENT DOCUMENTS

| 3,078,140 | A |   | 2/1963  | Hatch |
|-----------|---|---|---------|-------|
| 3,929,974 | A |   | 12/1975 | Winfield |
| 4,086,329 | A |   | 4/1978  | Cowley |
| 4,235,717 | A |   | 11/1980 | Lee |
| 5,063,041 | A |   | 11/1991 | Wanngard |
| 5,324,497 | A |   | 6/1994  | Westerlund |
| 5,458,858 | A |   | 10/1995 | Dawkins |
| 5,681,446 | A | * | 10/1997 | Betts et al. ............. 205/503 |

(Continued)

FOREIGN PATENT DOCUMENTS

| CA | 1241131 A1 | 8/1988 |
|----|------------|--------|
| EP | 1479440 A2 | 11/2004 |
| JP | 08071553   | 3/1996 |

OTHER PUBLICATIONS

International Preliminary Report on Patentability (issued Jun. 21, 2011) and Written Opinion (mailed Aug. 24, 2009).
International Search Report and Written Opinion (mailed Aug. 24, 2009).

(Continued)

*Primary Examiner* — Arun S Phasge
(74) *Attorney, Agent, or Firm* — Jeffrey S. Melcher; Manelli Selter PLLC

(57) ABSTRACT

A process for reducing the concentration of perchlorate in an aqueous concentrated multi-component salt solution comprising treating the salt solution with an amphoteric ion-exchange resin to provide an adsorbed perchlorate and multi anion-containing resin and a perchlorate depleted solution; and removing the perchlorate depleted solution. The multi-anion are selected from chloride, chlorate, perchlorate, sulphate, and dichromate, present in electrolytic processes for the production of sodium chlorate.

25 Claims, 4 Drawing Sheets

(56) References Cited

U.S. PATENT DOCUMENTS

| | | | |
|---|---|---|---|
| 5,942,084 | A | 8/1999 | Thompson |
| 6,448,299 | B1 | 9/2002 | Brown |
| 6,482,305 | B1 | 11/2002 | Mani |
| 6,800,203 | B2 * | 10/2004 | Gu et al. .................. 210/677 |
| 7,250,144 | B2 | 7/2007 | Sanders |
| 7,399,725 | B2 | 7/2008 | Clarke |
| 7,407,581 | B2 | 8/2008 | Batista |
| 2005/0040111 | A1 | 2/2005 | Dale |
| 2005/0269269 | A1 * | 12/2005 | Jensen et al. ............. 210/670 |
| 2007/0208091 | A1 | 9/2007 | Trejo |
| 2007/0241056 | A1 * | 10/2007 | Klipper et al. ............ 210/660 |

OTHER PUBLICATIONS

Miyazaki et al. "Ion Exchange and Protonation Equilibria of an Amphoteric Ion-Exchange Resin in the Presence of Simple Salt", Analytical Sciences, Sep. 2008, vol. 24, pp. 1123-1127.

Matsushita "Sulfate Removal from Brine by Using Amphoteric Ion Exchange Resin", Journal of Ion Exchange, vol. 7 No. 3, 1996.

European Search Report issued Feb. 13, 2014 in European Patent Application No. 08878828.6, pp. 1-6.

Corresponding Russian Office Action issued Jul. 19, 2012.

DOWEX, Retardation 11A8 50-100 Mesh. Sent in Nov. 2, 2012.

Helfferich, "Ion Exchange" (1962) Dover Publications, pp. 1, 4-9, 58, 59, 432-443.

* cited by examiner

PERCHLORATE REMOVAL FROM CONCENTRATED SALT SOLUTIONS USING AMPHOTERIC ION-EXCHANGE RESINS

CROSS-REFERENCE TO RELATED APPLICATIONS

This application is a national stage entry under 35 U.S.C. 371 of International Application No. PCT/CA2008/002205, filed 17 Dec. 2008, designating the United States. The complete content of the aforesaid application is incorporated herein by reference.

FIELD OF THE INVENTION

This invention relates to the removal of perchlorate anions from concentrated salt solutions using amphoteric resins; and particularly, from sodium chlorate electrolyte solutions.

BACKGROUND OF THE INVENTION

In this specification and claims the term "perchlorate" denotes the perchlorate anion and salts thereof.

In some industrial processes, perchlorates are produced as the main product. For example, ammonium perchlorate manufactured for use in applications involving explosives and rocket fuels. In other chemical processes, such as the electrolytic production of sodium chlorate, perchlorate is generated as a byproduct and makes its way to downstream processes, often included as an impurity in the final product.

Perchlorate is a stable and highly water-soluble entity which exhibits high mobility in underground aquifers. In the past decade, the regulatory and public profile of perchlorate has been increasing, mainly driven by remediation of rocket fuel related sites in the United States and recognition of potential health effects resulting from its exposure through drinking water. As a result, governments are gradually moving towards the implementation of more stringent guidelines and regulations to minimize its impact on the environment.

Significant research efforts from both public and private organizations have resulted in the development of techniques to remove perchlorate. However, many of the methods have been specifically developed to remove low concentration of perchlorate in water only, and no work has focused on the removal of high perchlorate content from complex ionic solution matrices, such as the sodium chlorate electrolyte solution, which contains several components.

Sodium chlorate is the primary feedstock used for the production of chlorine dioxide, used in pulp bleaching, as well as the key material feedstock for sodium chlorite production.

Chlorine dioxide is produced by reacting sodium chlorate with an acid, generally, sulfuric or hydrochloric acid. In some plants, the sodium chlorate is supplied as crystals, and in fewer occasions as an aqueous solution from a merchant plant. Many pulp and paper facilities, however, produce chlorine dioxide by the so-called "integrated process". In the closed loop "integrated process", a sodium chlorate solution is produced by an on-site electrolytic system and fed directly to a chlorine dioxide generation unit. This produces chlorine dioxide gas and a partially depleted sodium chlorate liquor, which is rich in sodium chloride and recycled back to the electrolytic system for enrichment.

The electrochemical production of sodium chlorate by the electrolysis of sodium chloride solution in an electrolysis cell can generally be described by the following overall reaction:

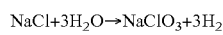

$NaCl + 3H_2O \rightarrow NaClO_3 + 3H_2$

In more detail, the electrolysis of sodium chloride produces chlorine at the anode and hydroxide plus hydrogen at the cathode; and, in an undivided electrolytic cell, the produced chlorine and hydroxide react to form hypochlorous acid and hypochlorite ion, which further react in solution to form chlorate. To avoid excessive production of oxygen through anodic side reactions, the sodium chloride concentration is controlled resulting in a solution containing mainly sodium chlorate and sodium chloride compounds. This mixture is typically referred to as "cell liquor". To further promote efficiency in the electrolytic cells, the addition of a chemical agent such as sodium dichromate is well known in the industry. However, this additive contributes to heavy metal contamination issues due to the chromium content.

In a Sodium Chlorate merchant plant, sodium chlorate crystals are obtained from the cell liquor by selective crystallization. The remaining liquor after selective crystallization of sodium chlorate, typically referred to as "mother liquor" is recirculated to the electrolyzer, along with the addition of sodium chloride, in the form of brine solution, to maintain the sodium chloride level in the solution for optimum electrolytic performance.

There are several undesirable reactions occurring during electrolysis that can lower the overall cell efficiency, thus increasing the net energy consumption. The formation of sodium perchlorate ($NaClO_4$) in the cell, well recognized to be a significant side reaction, occurs by direct electrochemical oxidation of sodium chlorate. The subsequent accumulation of highly water-soluble sodium perchlorate in the cell liquor ultimately reduces the solubility of sodium chloride, which, in turn, directly affects the cell operation and, in particular, the anode performance with respect to by-product oxygen production, "wear" rate or life of expensive electro-catalytic anode coating, and energy consumption through anodic over-potential. Eventually, the perchlorate concentration builds up to a level where it is purged with the final product as crystals or liquid solution, subsequently finding its way to the downstream chlorine dioxide facility and possibly further making its way into the process effluent.

The formation of sodium perchlorate becomes a larger problem when sodium chlorate is produced in an integrated or closed loop chlorine dioxide system, where there is neither a crystal nor liquid purge for the perchlorate. In the integrated or closed loop chlorine dioxide process, significant amounts of sodium perchlorate can accumulate and thereby promote precipitation of salt in the chlorine dioxide generator, which ultimately can lead to unstable generator operation.

In a modern facility, the formation of perchlorate in the electrolyzer is influenced by several factors; including the sodium chloride concentration in the cell liquor, the anode condition and type of electro-catalytic anode coating, the operating current density, and concentration levels of other impurities such as iron and silica. In various facilities, the formation of perchlorate has been observed to vary between 50 and 500 milligrams sodium perchlorate per kilogram sodium chlorate. For a 100 tonne per day sodium chlorate production plant, this is equivalent to 5 to 50 kg/day of sodium perchlorate, which either accumulates within the system and resulting in operational problems, or directly or indirectly finds its way into the environment.

Further to the aforementioned problems associated with accumulation of perchlorate in sodium chlorate process and particularly in a merchant sodium chlorate crystal plant, increased levels of sodium perchlorate will lead to reduction of sodium chloride solubility in the electrolyte, further complicating the flash crystallization operation. For an integrated chlorine dioxide process, as documented in U.S. Pat. No.

5,324,497 (1994), U.S. Pat. No. 3,929,974 (1975), and U.S. Pat. No. 4,086,329 (1978) assigned to Erco, and U.S. Pat. No. 5,458,858 (1995), assigned to Vulcan, a decreased solubility of sodium chloride due to higher levels of sodium perchlorate will cause more sodium chloride to precipitate in the chlorine dioxide generator, resulting in increased down time and higher maintenance costs. Methods for the removal of sodium perchlorate from sodium chlorate liquors are known in the art. The addition of potassium chloride can be used to preferentially precipitate sodium perchlorate as potassium perchlorate from sodium chlorate electrolyte solution, but achieving perchlorate levels below 40 grams per liter (gpl) without significant simultaneous losses of chloride and chlorate remained unresolved.

U.S. Pat. No. 5,063,041, assigned to Eka Nobel AB describes a process to further reduce the sodium perchlorate content in cell liquor by first concentrating a portion of the chlorate liquor by evaporation, followed by cooling and precipitating with the addition of potassium chloride; the solid phase is then separated and the liquid phase is recirculated back to the chlorate process. A 50% reduction in the electrolyte volume could gradually reduce the perchlorate levels down to near 20 gpl, while a 75% or more reduction in the electrolyte volume would be required to achieve 10 gpl sodium perchlorate levels using this approach.

U.S. Pat. No. 5,681,446 assigned to Sterling Pulp Chemicals describes a process using simultaneous addition of calcium chloride and the potassium chloride to a portion of the sodium chlorate mother liquor after the sodium chlorate crystallizer to reduce both sulphate and perchlorate impurities. By treating the mother liquor instead of the electrolyzer cell liquor, costly evaporation is avoided. However, neither experimental results nor operating data is given on the achievable equilibrium levels of sodium perchlorate in the process. Unfortunately, the process produces a mixture of calcium sulphate and potassium perchlorate sludge, significantly contaminated with chemical compounds containing chloride, chlorate and dichromate.

The above processes produce a toxic sludge contaminated with chlorate and dichromate (hexavalent chromium) which would require further treatment before disposal. The treatment process can be complex and disposal costs can be prohibitive.

U.S. Pat. No. 7,250,144 assigned to Tronox LLC describes a process where a secondary crystallization step without the use of chemical treatment is utilized to enhance the removal of perchlorate from sodium chlorate liquors. This multi-stage crystallization process claims to lower the sodium perchlorate content to below 1 gpl. It also claims that a majority of the first crystallizer mother liquor is processed within a secondary vacuum crystallizer where the perchlorate concentration is gradually increased to a high level, while the perchlorate content in the main process is systematically decreased to less than 1 gpl. But operation of a second crystallizer is often associated with substantial capital and operation costs. Also, no detailed description of the quality of the concentrated perchlorate liquor is provided nor is a disposal method mentioned. Hence, since it's a byproduct of a sodium chlorate production system, one skilled in the art can deduce that this perchlorate liquor will contain some quantity of chlorate, chloride and dichromate. Therefore, in addition to the extra crystallization equipment and processing steps the costs involved for the treatment and disposal of a contaminated byproduct would also render the approach to be less economically attractive.

Chemical treatment using potassium chloride and other potassium salts represents a significant operating expense, while the addition of a secondary crystallizer will also add significant capital costs with associated increase of energy requirements. Accordingly, there is still a need in the industry for improved methods for removal of perchlorate from an electrolytic process for producing sodium chlorate.

The use of weak-base anion exchange resins for the removal of anions from ground water is well-known in the field. These weak-base anion resins have a high capacity for monovalent anions such as chloride, hydroxide and bicarbonate; therefore, they're not efficient for the removal of perchlorate ions in a highly ionic matrix and have not been applied in process systems for the production of sodium chlorate. However, strong-base anion exchange resins like Purolite 530E, a specially functionalized resin originally developed by Oak Ridge National Laboratories in the United States, have shown greater selectivity and higher capacity for perchlorate than weak-base anion resins, but they're also much more difficult to regenerate, which often require unconventional recovery methods like those described by U.S. Pat. No. 6,448,299 assigned to U.T. Battelle, LLC "Regeneration of Strong-Base Anion-Exchange Resins by Sequential Chemical Displacement" which describes the regeneration process using a mixture of strongly acidic tetrachloroferrate ($FeCl_4^-$) and hydrochloric acid. This technique, although technically viable, is often not economical and requires complex regeneration steps and the use of hazardous chemicals. Furthermore, any disposal of the hazardous regeneration fluids and their inherent chemical incompatibility within the sodium chlorate process that might occur through unintentional contamination, will further limit its practical application.

Amphoteric resins, also known as ion-retardation resins contain both anionic and cationic adsorption sites which are so closely associated that they partially neutralize other's electrical charges as described in detail by U.S. Pat. No. 3,078,140 assigned to The DOW Chemical Company. However, the sites still have sufficient attraction for mobile anions and cations so that the resins will adsorb both cations and anions from solution with which it comes in contact, but the adsorbed ions can be displaced from the resins by the use of water as an eluant. These resins are commercially available from Dow Chemical Company (Trade name: Dowex Retardion 11A8) and Mitsubishi Chemical Corporation (Trade name: Diaion AMP01, Diaion DSR01) and others.

The Dowex Retardion 11A8 resin, also known as snake-in-a-cage type resin contains both weak acid cation and strong base anion functionality within the same resin; ions are separated from each other based on their affinity to the adsorption sites. The Mitsubishi Diaion AMP01 is classified as a betaine type resin, a neutral chemical compound with a positively charged cationic functional group and with a negatively charged functional group. The two resins exhibit similar ion-retarding action.

A paper by Takeshi Matsushita "Sulfate Removal from Brine by Using Amphoteric Ion Exchange Resin" published in the Journal of Ion Exchange, Vol. 7 No. 3 (1996) describes the use of amphoteric resin "Diaion DSR01" containing both quaternary ammonium group (strong base anion) with a carboxyl group (weakly-acidic cation) on a single aromatic group for the separation of sulphate and chlorate from a brine solution. Other applications of amphoteric resins are disclosed by U.S. Pat. No. 6,482,305 assigned to Archer-Daniels-Midland Company (Nov. 19, 2002). This patent illustrates how a combination of several chromatographic separation steps using amphoteric resins can be applied to the chlor-alkali process. One application is for reduction of chloride salt from a moderately strong alkali solution and another application disclosed is for the reduction of chlorate from acidified brine solution.

The use of amphoteric resins for the separation of sodium chloride, sodium chlorate and sodium sulphate in ionic solution has been successfully demonstrated and commercially applied in the chloralkali industry. Depending on the degree of affinity of the various ions to the ion-retardation resins, elution of the adsorbed ions can be achieved by passing demineralised water to fractionate mixtures of highly ionized substances to enable recovery and reuse of the major chemical components. This simpler water "regeneration" is unlike that required for common ion-exchange resins, where the cations or anions are ionically exchanged and held strongly or captured at the exchange sites thus needing the use of regeneration chemicals that can displace the captured ions; and furthermore, the resulting regeneration effluent solutions in conventional "capture" ion exchange systems must also be treated before disposal. Since ion retardation requires only water for "regeneration", it can be more profitably employed where ion exchange is not economically practical, especially in complex ionic solution matrices, such as the sodium chlorate electrolyte solution.

SUMMARY OF THE INVENTION

The present invention relates to the separation and optional recovery of perchlorate from multi-component ionic solutions and provides a reduction in the level of perchlorate impurity in a desired final product. The invention further provides a reduction in perchlorate levels in industrial process solutions as to improve operational performance and economics of the process.

The present invention has a preferred utility in the removal of alkali metal perchlorate impurity from electrolytic production processes, particularly, sodium perchlorate removal from sodium chlorate solution produced by the electrolysis of sodium chloride.

Thus, it is an object of the present invention to provide a process for the removal of perchlorate impurity from concentrated aqueous solutions containing multiple ionic components, whereby perchlorate lean and perchlorate rich solution fractions are produced.

It is a further object of the invention to provide a cost effective process to reduce the perchlorate concentration in a sodium chlorate electrolyte solution, whereby a perchlorate depleted solution fraction comprising mainly sodium chlorate, sodium chloride, sodium dichromate and sodium sulphate is suitable for recycling and reuse in the main process system; and a perchlorate rich liquid fraction, relatively free of other chemical contaminations, which can be further treated to recover the perchlorate as a product, or to convert the perchlorate into environmentally benign components, or to convert the perchlorate into useable components for recycle into the main process.

The inventive process is especially applicable to the sodium chlorate electrolytic process where the inherent build-up of sodium perchlorate can occur. However, it is also applicable to other industrial processes where perchlorate is present and needs to be removed from the process stream, more particularly, to processes with complex ionic solutions. The terms complex ionic solution refer to solutions containing several or many solutes in an aqueous solution, wherein the solutes are compounds that dissociate into ions. The fundamental nature of such "multi-ion" solutions is not yet understood well enough to predict specific behavior, especially in solutions with very high concentrations of one or more of these compounds since interaction with each other will often cause unpredictable results.

Surprisingly, we have found that amphoteric (ion-retardation) resins can be used in complex and concentrated solutions, for example, sodium chlorate solutions, having high concentration of monovalent ions, such as, for example, chloride and chlorate, and divalent ions like dichromate and sulphate to effect selective separation of perchlorate as to allow of its economical and chemical-free separation.

Accordingly, in one aspect, the invention provides a process for reducing the concentration of perchlorate in an aqueous concentrated multi-component salt solution comprising treating said salt solution with an amphoteric resin to provide an adsorbed perchlorate and multi anion-containing resin and a perchlorate-depleted solution; and removing said perchlorate depleted solution.

In a preferred aspect, the invention provides a process, as hereinabove defined, further comprising treating said adsorbed perchlorate and multi anion-containing resin with a first quantity of elution water to provide a lean first eluent and a first eluted resin; and collecting said lean first eluent.

In a further embodiment, a process as, hereinabove defined, further comprising treating said first eluted resin with a second quantity of elution water to provide a rich second eluent and a second eluted resin; and collecting said rich second eluent.

By the term "lean" in this specification and claims is meant that the ratio of perchlorate concentration to the combined concentration of the other components is smaller than the ratio in the salt solution.

By the term "rich" is meant that the ratio of perchlorate concentration to the combined concentration of the other components is greater than the ratio in the salt solution.

In a preferred embodiment, the process as hereinabove defined further comprises recycling the perchlorate-depleted solution to a process selected from the group consisting of an electrolytic sodium chlorate process, integrated chlorine dioxide process and sodium chlorite production process.

In an alternative embodiment, the treatment of the resin enriched in perchlorate with the first quantity of elution water and the first eluted resin with the second quantity of elution water constitutes a continuous process step.

Preferably, the multi-component salt solution comprises anions selected from the group consisting of chloride, chlorate, perchlorate, sulphate and dichromate.

Preferably, the amphoteric resin has a resin first volume, or bed volume and the combined first quantity and second quantity of total elution water has a volume of about 1 to 10 times, more preferably, 2 to 5 times the resin first volume.

A process as hereinabove defined is of particular value wherein the salt solution comprises 1 to 700 gpl $NaClO_3$
0 to 300 gpl $NaCl$
0 to 20 gpl $Na_2Cr_2O_7$
0 to 50 gpl $Na_2SO_4$
0.1 to 140 gpl $NaClO_4$;
preferably,
300 to 650 gpl $NaClO_3$
80 to 130 gpl $NaCl$
0 to 10 gpl $Na_2Cr_2O_7$
0 to 25 gpl $Na_2SO_4$
0.5 to 100 gpl $NaClO_4$; and
more preferably
480 to 620 gpl $NaClO_3$
80 to 110 gpl $NaCl$
4 to 6 gpl $Na_2Cr_2O_7$ 5 to 20 gpl $Na_2SO_4$
20 to 50 gpl $NaClO_4$ Most preferably, the salt solution is a cell liquor produced from the electrolysis of sodium chloride solution in a sodium chlorate electrolyzer.

In a further embodiment, the salt solution is a mother liquor exiting a sodium chlorate crystallizer in a sodium chlorate electrolytic process.

The adsorbed perchlorate and multi-ions are eluted with the elution waters from the resin in the order of their inverse affinity to the amphoteric resin as to separate the perchlorate and other component ions where the less affixed ions are first eluted to produce the lean first eluent, while the more strongly affixed perchlorate is eluted subsequently with elution water to produce the rich second eluent.

Most preferably, the elution water is demineralized water.

Optionally, a process as hereinabove defined further comprising recycling the perchlorate-depleted solution to a process selected from the group consisting of, but not limited to, an electrolytic sodium chlorate process, an integrated chlorine dioxide process and a sodium chlorite production process.

Most preferably, a process as hereinabove defined further comprises recycling the lean first eluent to a process selected from the group consisting of an electrolytic sodium chlorate process, an integrated chlorine dioxide process and a sodium chlorite production process.

Thus, a multi-component sodium chlorate electrolyte solution containing perchlorate is purified by passing through suitable equipment, for example, a column or vessel, containing ion-retardation resins so as to separate the sodium perchlorate impurity from the other components of the sodium chlorate electrolyte solution. A portion of the sodium perchlorate is thereby removed from the sodium chlorate or integrated chlorine dioxide processes. The process can be operated in either a continuous mode to maintain a steady-state reduced perchlorate concentration or in periodic batch mode operated until the concentration of sodium perchlorate is reduced below a desirable level for plant operation. The removal of sodium perchlorate component from the electrolytic production process allows for extended process operating time, improved raw material utilization, and improved reaction efficiency. The resins are also easily regenerated by eluting the sodium perchlorate with water and the resins regeneration process does not introduce any foreign or specialty chemicals, thus enabling easy incorporation to the existing sodium chlorate process. Furthermore, since the perchlorate solution produced is free of other environmentally hazardous contaminants, mainly chlorate and dichromate, less complex and less expensive disposal options can be considered.

Typically, not the whole inventory or total flow of sodium chlorate electrolyte solution in the process needs to be treated but the amount is based on the perchlorate level needed to be maintained within the overall process, as well as the rate of production of perchlorate in the electrolytic circuit. For example, a facility generating 20 kg/day of perchlorate desiring to maintain a perchlorate concentration of 20 gpl in the main circuit will theoretically need to process only 1 cubic meter of liquor per day, or 4 cubic meters per day if a 5 gpl perchlorate level is desired in the main circuit. This is a relatively small side stream flow in facilities where the main hourly liquor flows are measured in the 50 to 100 $m^3/h$ range. Hence the volume of resin required and the size of the equipment involved, as a function of the above factors, can be relatively small, particularly for the continuous operation mode.

For the separation of the chemical components, only water is needed as the eluent to fractionate the perchlorate lean and perchlorate rich portions, wherein the required elution water volume can be as little as two to three times the resin volume. A significant portion of the elution volume and, in particular, the perchlorate lean fraction, containing product sodium chlorate, sodium chloride feedstock, and the sodium dichromate process aid is suitable for recycling to the main process for chemical recovery; such as to the electrolysis system or the brine preparation step or others. The eluted perchlorate rich solution can then be treated or destroyed as dictated by the treatment or disposal methods selected. For example, the perchlorate rich solution can be further concentrated through evaporation for subsequent sale or disposal to a suitable facility, or crystallized or precipitated in a closed loop system with the disposal of solids as needed. Several possible product compounds of perchlorate can be obtained from the relatively pure sodium perchlorate solution according to appropriate chemical addition; such products include potassium perchlorate and ammonium perchlorate, calcium or magnesium perchlorate, and perchloric acid, the latter involving a distillation step. Alternately, the perchlorate rich solution could also be processed for the destruction of the perchlorate content by electrolytic reduction, thermal decomposition, electro-catalytic and/or any other methods or processes known in the art. The resulting solution containing mainly sodium chloride can then be recycled to the main process stream for material make-up. In such a case, the purity of the eluted solution is of less importance as all chemicals contained are common to the main process and the elution cycle switching steps can be adjusted less critically.

In a further aspect, the invention provides a process, as hereinabove defined, further comprising recycling said lean first eluent to a process selected from the group consisting of an electrolyte sodium chlorate process, an integrated chlorine dioxide process and a sodium chlorite production process.

In a further aspect, the invention provides a process, as hereinabove defined, further comprising treating said rich second eluent to provide a recovered perchlorate.

In a further aspect, the invention provides a process, as hereinabove defined, further comprising treating said rich second eluent to a perchlorate destruction process to remove said perchlorate and produce a perchlorate-depleted solution.

In a further aspect, the invention provides a process, as hereinabove defined, wherein said destruction process is selected from the group consisting of electrolytic reduction, thermal decomposition and an electro-catalytic process.

In a further aspect, the invention provides a process, as hereinabove defined, further comprising recycling said perchlorate-depleted solution to a process selected from the group consisting of an electrolyte sodium chlorate process, an integrated chlorine dioxide process and a sodium chlorite production process.

In a further aspect, the invention provides a process, as hereinabove defined, further comprising treating said adsorbed perchlorate and multi-anion-containing resin with elution water to provide a perchlorate-containing eluent.

In a further aspect, the invention provides a process, as further comprising treating said perchlorate-containing eluent to provide a recovered perchlorate.

In a further aspect, the invention provides a process, as hereinabove defined, further comprising treating said perchlorate-containing eluent to a perchlorate destruction process to remove said perchlorate and produce a perchlorate-depleted solution.

In a further aspect, the invention provides a process, as hereinabove defined, wherein said destruction process is selected from the group consisting of electrolytic reduction, thermal decomposition and an electro-catalytic process.

In a further aspect, the invention provides a process, as hereinabove defined, further comprising recycling said perchlorate-depleted solution to a process selected from the group consisting of an electrolyte sodium chlorate process, an integrated chlorine dioxide process and a sodium chlorite production process.

BRIEF DESCRIPTION OF THE DRAWINGS

In order that the invention may be better understood, preferred embodiments will now be described by way of example only with reference to the accompanying drawings wherein

FIGS. 4, 5, 6 and 7 are graphical representations of elution curves of sodium chlorate liquor, separated according to the invention; wherein FIG. 4 represents separation of sodium perchlorate from chlorate liquor (iterated cycles);

FIG. 5 represents perchlorate retention on 400 cm3 of Dowex 11A8 Retardion Resin as a function of perchlorate concentrate in the chlorate process stream;

FIG. 6 represents separation of sodium perchlorate from sodium chlorate liquor containing sodium chloride and sodium dichromate using Diaion AMP01 Amphoteric Resin;

FIG. 7 represents separation of sodium perchlorate from sodium chlorate liquor containing sodium chloride, sodium sulphate and sodium dichromate using Diaion AMP01 Amphoteric Resin;

and wherein the same numerals denote like parts.

DETAILED DESCRIPTION OF PREFERRED EMBODIMENTS

Figure 1:
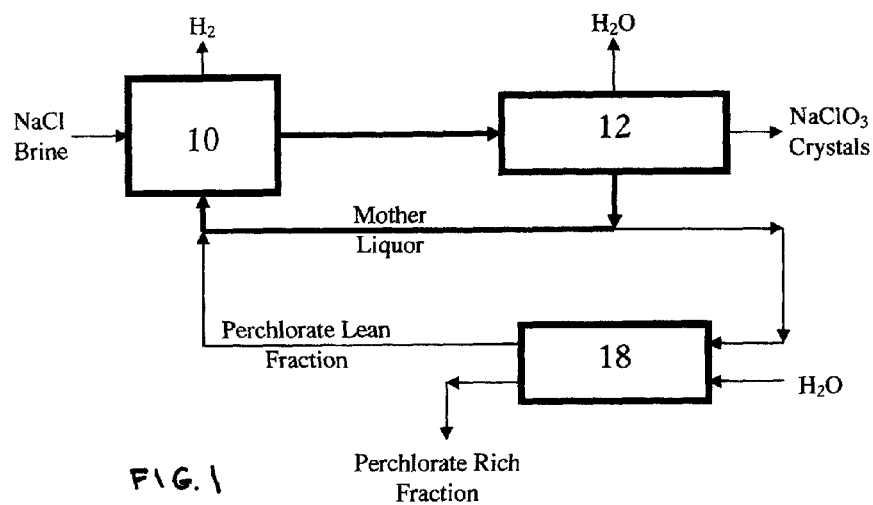
FIG. 1 is a schematic flow chart of a crystalline sodium chlorate process according to the invention wherein at least a portion of the sodium chlorate crystallizer liquor is passed through an amphoteric ion retardation resin bed before recycling to the electrolyzer cells.

Perchlorate selective anion exchange resins currently used for the removal of perchlorate in ground water were screened using a static beaker test for their potential application for the removal of perchlorate from typical sodium chlorate liquors. Purolite strong basic anion exchange resins A-530E were chosen for further evaluation using packed bed continuous flow operation. Purolite A-530E is a unique dual amine bi-functional resins that exhibit a high selectivity for perchlorate. The resins were originally developed and commercialized by Oak Ridge National Laboratories (ORNL) as "D-3696" or "BiQuat" resins. Regeneration of the ion exchange resins using ferric chloride/hydrochloric acid in methanol as well as a high strength ferric chloride/hydrochloric acid regeneration methods as cited in U.S. Pat. No. 6,448,299 were also evaluated. A Bio-Rad 1×30 cm jacketed econo-column was filled with 20 cm³ of resins. The resins were hydrated in deionised water (DI) for at least 24 hours, prior to loading into the column. Sodium chlorate liquor was loaded onto the resin column at 2 ml/min, in a down flow direction at room temperature. After 15 bed volumes (BV's) of chlorate liquor loading, the column was thoroughly washed with deionised water to remove any free chlorate liquor. Column regeneration was carried out at 1.5 ml/min, in a down flow direction at room temperature. Repeated reloading and regeneration of the column quickly revealed that the regeneration step using ferric chloride/hydrochloric acid in methanol was incomplete, and that the resin capacity for perchlorate removal had dropped significantly. The experiment was repeated with a new batch of resins and regenerated using the improved method describe in U.S. Pat. No. 6,448,299 "Regeneration of Strong-Base Anion-Exchange Resins by Sequential Chemical Displacement" which describes the regeneration process using strongly acidic tetrachloroferrate ($FeCl_4^-$) and hydrochloric acid without the use of an organic solvent. The initial chlorate liquor analysis as well as the eluent analysis after processing 40 mL of chlorate liquor through the resins, or after two equivalence resin bed volumes (BV), is shown in Table #1.

TABLE #1

Perchlorate removal from Chlorate Liquor using strong-base anion exchange resin (Purolite A-530E)

| | $Cr_2O_7^{-2}$ g/L | $Cl^-$ g/L | $ClO_3^-$ g/L | $ClO_4^-$ g/L |
|---|---|---|---|---|
| Chlorate Liquor Feed | 5.0 | 62.8 | 357 | 5.4 |
| New Resin Eluent | 3.2 | 60.4 | 342 | 0.7 |
| After 1$^{st}$ Regeneration Eluent | 3.7 | 60.5 | 345 | 0.2 |
| After 2$^{nd}$ Regeneration Eluent | 3.6 | 56.0 | 323 | 0.2 |

Although the Purolite A-530E strong-base anion exchange resins using the regeneration process described in U.S. Pat. No. 6,448,299 showed significant improvement compared to the first regeneration method using ferric chloride/hydrochloric acid in methanol, concerns remain about the use of strongly acidic tetrachloroferrate ($FeCl_4^-$) and hydrochloric acid regenerant in the sodium chlorate process due to its chemical incompatibility, as well as the resin capacity for perchlorate ions and its selectively. The resins show good affinity for perchlorate ions, but also to a lesser degree dichromate and chlorate ions. Therefore, ion exchange resins do not separate sodium perchlorate effectively in a complex and ionized chlorate liquor matrix.

The present invention, in one aspect, relates to an improved method of removing perchlorate from an aqueous solution that allows selective separation of perchlorate from a complex ionic aqueous solution containing multiple components including sodium chloride, sodium chlorate, sodium sulphate, sodium dichromate and sodium perchlorate. The inventive process is applicable to the sodium chlorate electrolytic process where the intrinsic accumulation of sodium perchlorate can occur. Mother liquor from the sodium chlorate crystallizer, preferably active chlorine free and at temperature dictated by the crystallizer operation, typically from 20-50° C., is purified by passing it through an amphoteric resin unit, so as to separate the sodium perchlorate impurity from the sodium chlorate electrolyte solution. Consequently, a portion of the sodium perchlorate in the sodium chlorate production process is thereby removed from the process. The process can be operated in a continuous or batch mode or until the concentration of sodium perchlorate is reduced to its desired level. The resins are easily regenerated using water as eluent at a temperature range, preferably above the freezing point of water to the boiling point of water, but more preferably in the range of room temperature to 90° C., with the maximum temperature below the highest operating temperature recommended by the resin manufacturers. Since only water is needed for the regeneration of the resins and no foreign or specialty chemicals are introduced to the process, it is easy to incorporate the perchlorate removal system in the existing sodium chlorate process. In addition, the eluted perchlorate lean fraction from the ion-retardation process can be recycled to the main process for chemical recovery, while the eluted perchlorate rich fraction, free of other chemical components, can be reduced or destroyed via methods known in the art, such as those described in, for example, U.S. Pat. No. 6,800,203—Gu et al; U.S. Pat. No. 7,399,725—Clark et al; and U.S. Pat. No. 7,407,581—Batista, as well as microbial degradation as in bioreactors, bioremediation or composting, or further purified and concentrated for other industrial use.

The crystalline chlorate process according to the invention is illustrated by the flow chart in FIG. 1, wherein 10 illustrates a chlorate electrolyzer system, 12 illustrates a chlorate crystallization and separation process, and 18 represents an amphoteric resin bed involving the inventive step perchlorate removal from chlorate mother liquor.

Figure 2:
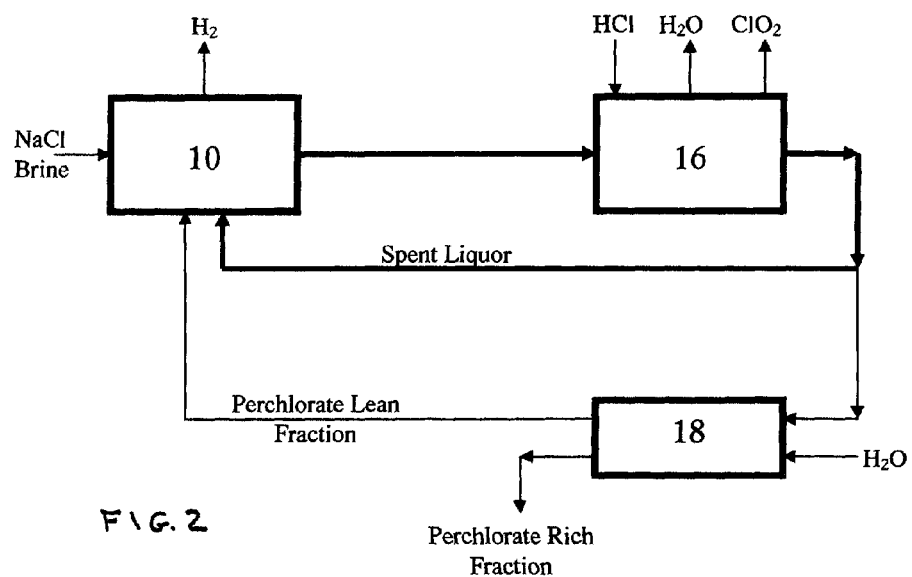
FIG. 2 is a schematic flow chart of an integrated chlorine dioxide process according to the invention where at least a portion of the spent liquor after generation/evaporation is passed through an amphoteric ion retardation resin bed before recycling to the electrolyzer cells.

The integrated chlorine dioxide process according to the invention is illustrated by the flow chart in FIG. 2, wherein 10 illustrates a chlorate electrolyzer system, 16 illustrates a chlorine dioxide generator/evaporator process, and 18 represents an amphoteric resin bed involving the inventive step of perchlorate removal from spent liquor and/or other choice of liquor source within the process.

Figure 3:
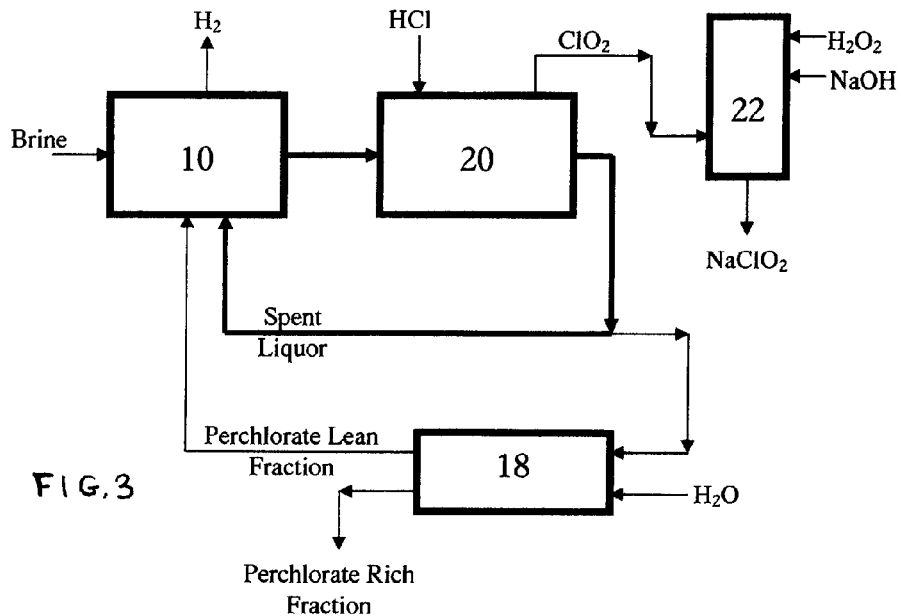
FIG. 3 is a schematic flow chart of the sodium chlorite production process according to the invention wherein at least a portion of the spent liquor after generation/evaporation is passed through an amphoteric resin bed before recycling to the electrolyzer cells.

The sodium chlorite process according to the invention is illustrated by the flow chart in FIG. 3, wherein 10 illustrates a chlorate electrolyzer system, 20 illustrates the chlorine dioxide generator/evaporator process, 22 represents a sodium chlorite production system, and 18 represents an amphoteric resin bed involving the inventive step of perchlorate removal from spent generator liquor and/or other choice of liquor source within the process.

EXAMPLES

Example 1

Figure 4:
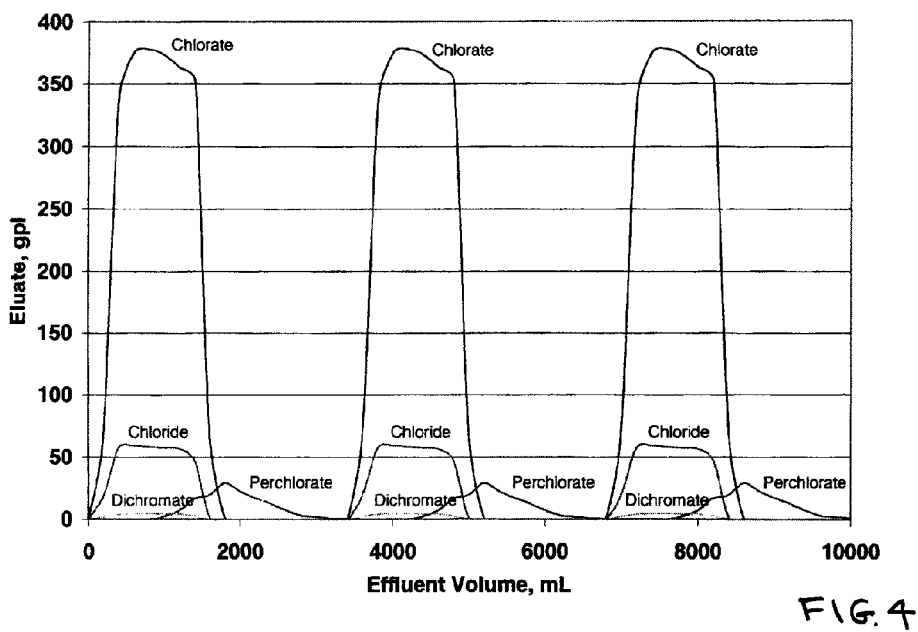

A chlorate liquor (pH 8.2) containing various inorganic salts at the concentrations shown in Table 2 was prepared. A 1200 ml portion of the chlorate liquor was pumped at a volumetric flow rate of 20 ml/min in a downward direction through a jacketed column filled with 400 cm$^3$ of amphoteric (ion retardation) resins (trade name: Dowex 11A8) at room temperature. This was followed by a 90° C. deionised water wash at a volumetric flow rate of 20 ml/min in a co-current direction. The eluent exiting the bottom of the ion retardation column was collected in fractions and analyzed for its salt components using Dionex 120 Ion Chromatography unit and the results are shown in FIG. 4.

TABLE #2

Perchlorate removal from Chlorate Liquor using Amphoteric resins (Dowex 11A8)

|  | $Cr_2O_7^{-2}$ g/L | $Cl^-$ g/L | $ClO_3^-$ g/L | $ClO_4^-$ g/L |
| --- | --- | --- | --- | --- |
| Chlorate Liquor Feed | 4.4 | 58.0 | 365.7 | 19.3 |

The results indicate that using an amphoteric (ion retardation) resin column, selective removal of perchlorate ions from chlorate liquor by properly selecting the fractions of eluent to be recovered was obtained.

Example 2

Figure 5:
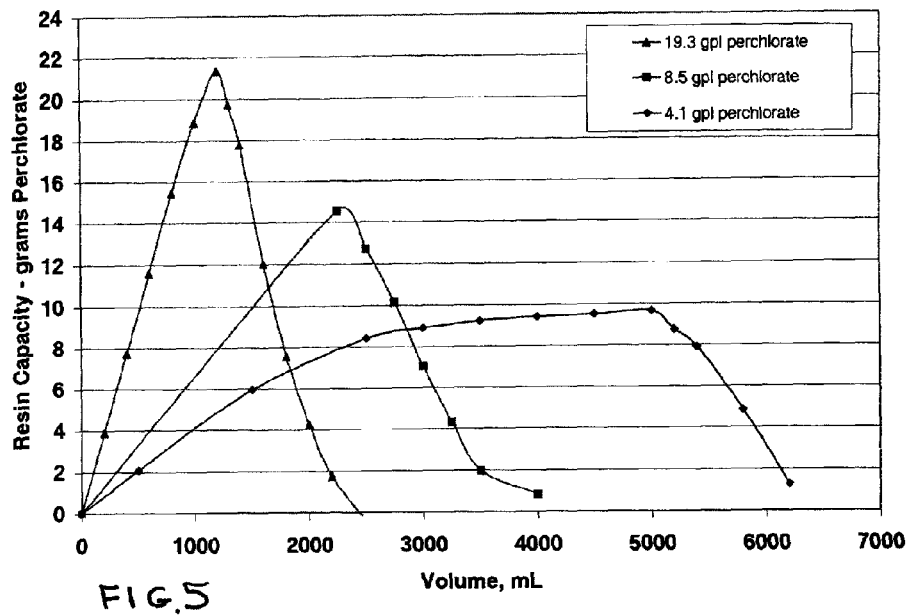

Chlorate liquors (pH 6.4-8.2) containing various inorganic salts at the concentrations shown in Table 3 were prepared. Between 1200-5000 ml portions of chlorate liquor were pumped at a volumetric flow rates between 20-50 ml/min in a downward direction through a jacketed column filled with 400 cm$^3$ of amphoteric (ion retardation) resins (trade name: Dowex® 11A8) at room temperature. This was followed by 80 to 90° C. deionised water wash at a volumetric flow rate of 20 ml/min in a co-current direction. The eluent exiting the bottom of the ion retardation column was collected in fractions and analyzed for its salt components using ion chromatography. The apparent resin capacity, as indicated by the amount of perchlorate retarded on the column, is illustrated as a function of perchlorate concentration of the feed process stream is shown in FIG. 5.

TABLE #3

Perchlorate removal from Chlorate Liquor using Amphoteric resin (Dowex 11A8)

|  | $Cr_2O_7^{-2}$ g/L | $Cl^-$ g/L | $ClO_3^-$ g/L | $ClO_4^-$ g/L |
| --- | --- | --- | --- | --- |
| Chlorate Liquor Feed - 1 | 4.4 | 58.0 | 365.7 | 19.3 |
| Chlorate Liquor Feed - 2 | 0 | 0.02 | 0.4 | 8.5 |
| Chlorate Liquor Feed - 3 | 3.5 | 48.1 | 305.2 | 4.1 |

Example 3

Figure 6:
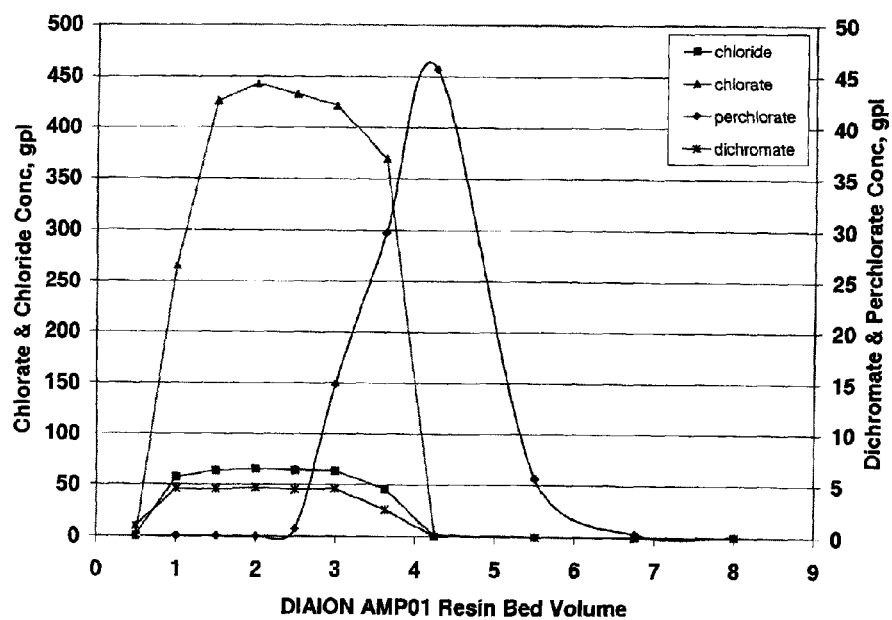

A 1200 mL sample of a chlorate liquor (pH 8.2) containing 4.6 gpl dichromate, 63.4 gpl chloride, 418.8 gpl chlorate and 21 gpl perchlorate was pumped at a volumetric flow rate of 20 ml/min in a downward direction through a jacketed column filled with 400 cm$^3$ of amphoteric ion exchange resins (trade name: Diaion® AMP01) at room temperature. This was followed by 85° C. deionised water wash at a volumetric flow rate of 20 ml/min in a co-current direction. The eluent exiting the bottom of the ion retardation column was collected in fractions and analyzed for its salt components using ion chromatography (see detail results in Table 4 and FIG. 6).

TABLE #4

Perchlorate removal from Chlorate Liquor using Amphoteric resin (Diaion AMP01 Amphoteric Resin)

| Volume mL | Temp ° C. | $Cr_2O_7^{-2}$ g/L | $Cl^-$ g/L | $ClO_3^-$ g/L | $ClO_4^-$ g/L |
| --- | --- | --- | --- | --- | --- |
| Chlorate Liquor Feed | 21 | 4.6 | 63.4 | 418.8 | 21.0 |
| 200 | 21 | 1.0 | 0.9 | 0.2 | 0.0 |
| 400 | 21 | 4.6 | 56.6 | 265.3 | 0.0 |
| 600 | 21 | 4.5 | 63.2 | 426.0 | 0.0 |
| 800 | 21 | 4.7 | 65.0 | 442.5 | 0.0 |
| 1000 | 21 | 4.5 | 63.5 | 432.5 | 0.7 |
| 1200 | 30 | 4.6 | 63.1 | 421.4 | 14.8 |
| Water Wash |  |  |  |  |  |
| 1450 | 85 | 2.6 | 45.6 | 369.2 | 29.7 |
| 1700 | 85 | 0 | 0.1 | 2.1 | 45.7 |
| 2200 | 85 | 0 | 0 | 0.2 | 5.6 |
| 2700 | 85 | 0 | 0 | 0 | 0.3 |
| 3200 | 85 | 0 | 0 | 0 | 0.0 |

After displacing the original chlorate liquor with approximately 250 mL of wash water (1450 mL-total volume over column), the perchlorate rich fraction (1700-2700 mL) was diverted and collected separately, leaving behind a perchlorate lean stream containing nearly all of the dichromate, chloride and chlorate components.

Example 4

Figure 7:
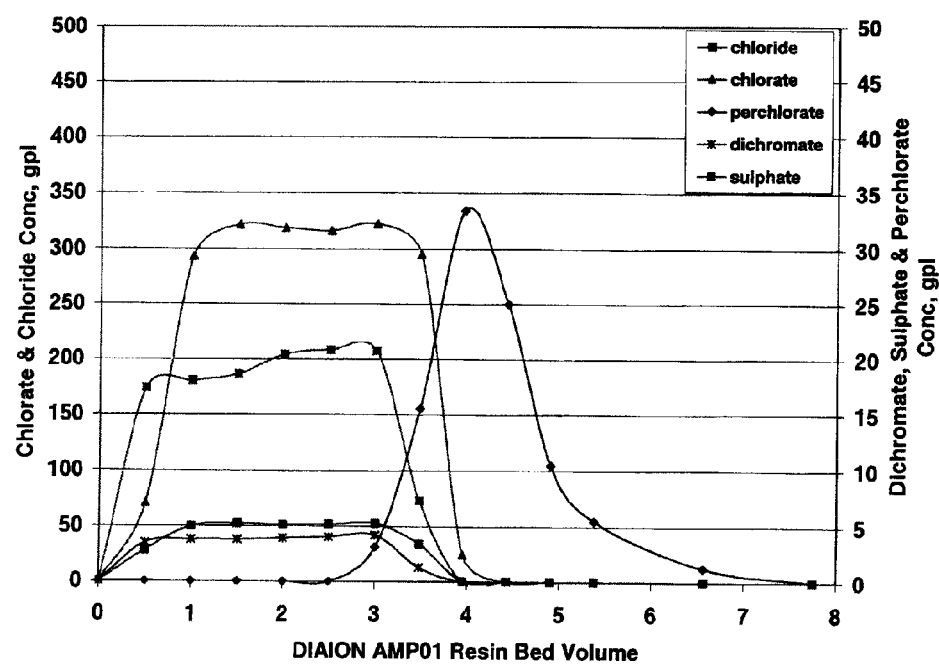

A 1200 mL sample of a chlorate liquor (pH 8.0) containing having 3.7 gpl dichromate, 50.9 gpl chloride, 312.7 gpl chlorate, 17.1 gpl sulphate and 13.9 gpl perchlorate was pumped at a volumetric flow rate of 20 ml/min in a downward direction through a jacketed column filled with 400 cm³ of amphoteric (ion retardation) resins (trade name: Diaion AMP01) at room temperature. The column was rinsed with 200 mL of deionised water at room temperature to displace most of the chlorate liquor prior to washing with 80° C. deionised water at a volumetric flow rate of 20 ml/min in a co-current direction. The eluent exiting the bottom of the ion retardation column was collected in fractions and analyzed for its salt components using ion chromatography (see detail results in Table 5; and FIG. 7).

TABLE #5

Perchlorate removal from Chlorate Liquor using Amphoteric resin
(Diaion AMP01 Amphoteric Resin)

| Volume mL | Temp ° C. | $Cr_2O_7^{-2}$ g/L | $Cl^-$ g/L | $ClO_3^-$ g/L | $SO_4^{-2}$ g/L | $ClO_4^-$ g/L |
|---|---|---|---|---|---|---|
| Chlorate Liquor Feed | 21 | 3.7 | 50.9 | 312.7 | 17.1 | 13.9 |
| 200 | 21 | 3.5 | 27.9 | 70.5 | 17.4 | 0 |
| 400 | 21 | 3.8 | 50.0 | 293 | 18.0 | 0 |
| 600 | 21 | 3.8 | 52.2 | 321 | 18.6 | 0 |
| 800 | 21 | 3.9 | 51.3 | 319 | 20.4 | 0 |
| 1000 | 21 | 4.0 | 51.7 | 316 | 20.8 | 0 |
| 1200 | 21 | 4.2 | 52.5 | 322 | 20.7 | 3.1 |
| Water Wash | | | | | | |
| 1400 | 21 | 1.3 | 34.1 | 295 | 7.3 | 15.5 |
| 1600 | 80 | 0 | 0.4 | 24.7 | 0 | 33.4 |
| 1800 | 80 | 0 | 0.3 | 0.2 | 0 | 25 |
| 2000 | 80 | 0 | 0.1 | 0.2 | 0 | 10.4 |
| 2200 | 80 | 0 | 0 | 0 | 0 | 5.5 |
| 2700 | 80 | 0 | 0 | 0 | 0 | 1.3 |
| 3200 | 80 | 0 | 0 | 0 | 0 | 0 |

After displacing most of the original chlorate liquor with approximately 200 mL of wash water (1400 mL-total volume over column), the perchlorate rich fraction (1600-2700 mL) was diverted and collected separately, leaving behind a perchlorate lean stream containing nearly all of the dichromate, chloride, sulphate and chlorate components.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

The embodiments of the invention to which an exclusive property or privilege is claimed are defined as follows:

1. A process for reducing the concentration of perchlorate in an aqueous concentrated multi-component sodium chlorate solution comprising mainly sodium chlorate, the process comprising:
    treating said sodium chlorate solution with an amphoteric resin to provide an adsorbed perchlorate and multi anion-containing resin and a perchlorate-depleted solution; and
    removing said perchlorate depleted solution.

2. The process according to claim 1 further comprising treating said adsorbed perchlorate and multi anion-containing resin with a first quantity of elution water to provide a lean first eluent and a first eluted resin; and collecting said lean first eluent.

3. The process according to claim 2 further comprising treating said first eluted resin with a second quantity of elution water to provide a rich second eluent and a second eluted resin; and collecting said rich second eluent.

4. The process according to claim 3, wherein said treatment of said adsorbed perchlorate resin with said first quantity of elution water and said first eluted resin with said second quantity of elution water constitutes a continuous process.

5. The process according to claim 3 wherein said amphoteric ion-exchange resin has a resin first volume and combined said first quantity and second quantity of said elution water has a total volume of about 1 to 10 times said resin first volume.

6. The process according to claim 5, wherein said total volume of elution water is about 2 to 5 times said resin first volume.

7. The process according to claim 3 further comprising treating said rich second eluent to provide a recovered perchlorate.

8. The process according to claim 3 further comprising treating said rich second eluent to a perchlorate destruction process to remove said perchlorate and produce a perchlorate-depleted solution.

9. The process according to claim 8, wherein said destruction process is selected from the group consisting of electrolytic reduction, thermal decomposition and an electro-catalytic process.

10. The process according to claim 8 further comprising recycling said perchlorate-depleted solution to a process selected from the group consisting of an electrolyte sodium chlorate process, an integrated chlorine dioxide process and a sodium chlorite production process.

11. The process according to claim 2, wherein said adsorbed perchlorate and multi-anions are eluted with said elution waters from said resin in the order of their inverse affinity to said amphoteric ion-exchange resin as to separate said perchlorate and anions wherein the less affixed anions are first eluted to produce said lean first eluent while the more strongly affixed perchlorate is eluted subsequently with said elution water to produce said rich second eluent.

12. The process according to claim 2, wherein said elution water is demineralized water.

13. The process according to claim 2 further comprising recycling said lean first eluent to a process selected from the group consisting of an electrolyte sodium chlorate process, an integrated chlorine dioxide process and a sodium chlorite production process.

14. The process according to claim 1, wherein said multi-component sodium chlorate solution additionally comprises anions selected from the group consisting of chloride, sulphate and dichromate.

15. The process according to claim 1, wherein said sodium chlorate solution comprises 300 to 650 gpl $NaClO_3$.

16. The process according to claim 15, wherein said sodium chlorate solution comprises:
    480 to 620 gpl $NaClO_3$;
    80 to 110 gpl $NaCl$;
    4 to 6 gpl $Na_2Cr_2O_7$;
    5 to 20 gpl $Na_2SO_4$; and
    20 to 50 gpl $NaClO_4$.

17. The process according to claim 15, wherein said sodium chlorate solution additionally comprises:

80 to 130 gpl NaCl;

3 to 10 gpl $Na_2Cr_2O_7$;

0 to 25 gpl $Na_2SO_4$; and 0.5 to 100 gpl $NaClO_4$.

18. The process according to claim 1, wherein said sodium chlorate solution is a cell liquor produced from the electrolysis of sodium chloride solution in a sodium chlorate electrolyzer.

19. The process according to claim 1, wherein said sodium chlorate solution is mother liquor exiting a sodium chlorate crystallizer in a sodium chlorate electrolytic process.

20. The process according to claim 1 further comprising recycling said perchlorate-depleted solution to a process selected from the group consisting of an electrolyte sodium chlorate process, an integrated chlorine dioxide process and a sodium chlorite production process.

21. The process according to claim 1 further comprising treating said adsorbed perchlorate and multi-anion-containing resin with elution water to provide a perchlorate-containing eluent.

22. The process according to claim 21 further comprising treating said perchlorate-containing eluent to provide a recovered perchlorate.

23. The process according to claim 21 further comprising treating said perchlorate-containing eluent to a perchlorate destruction process to remove said perchlorate and produce a perchlorate-depleted solution.

24. The process according to claim 23, wherein said destruction process is selected from the group consisting of electrolytic reduction, thermal decomposition and an electrocatalytic process.

25. The process according to claim 23 further comprising recycling said perchlorate-depleted solution to a process selected from the group consisting of an electrolyte sodium chlorate process, an integrated chlorine dioxide process and a sodium chlorite production process.

* * * * *